(12) United States Patent
Montanari (10) Patent No.: US 8,944,962 B2
(45) Date of Patent: Feb. 3, 2015

(54) GYMNASTIC TOOL, APPARATUS AND METHOD TO CARRY OUT IT

(75) Inventor: Giovanni Montanari, Forli (IT)

(73) Assignee: Trial S.r.l., Forli (FC) (IT)

( * ) Notice: Subject to any disclaimer, the term of this patent is extended or adjusted under 35 U.S.C. 154(b) by 165 days.

(21) Appl. No.: 13/383,799

(22) PCT Filed: Jul. 27, 2010

(86) PCT No.: PCT/EP2010/060920
§ 371 (c)(1),
(2), (4) Date: Jan. 12, 2012

(87) PCT Pub. No.: WO2011/012633
PCT Pub. Date: Feb. 3, 2011

(65) Prior Publication Data
US 2012/0129657 A1    May 24, 2012

(30) Foreign Application Priority Data
Jul. 28, 2009   (IT) .............................. BO2009A0495

(51) Int. Cl.
*A63B 26/00*    (2006.01)
*A63B 23/14*    (2006.01)
*A63B 23/16*    (2006.01)
*A63B 21/00*    (2006.01)
(Continued)

(52) U.S. Cl.
CPC ............ *B29D 22/00* (2013.01); *A63B 21/0004* (2013.01); *A63B 41/00* (2013.01); *A63B 41/085* (2013.01); *A63B 43/002* (2013.01); *B29C 41/04* (2013.01); *B29C 41/20* (2013.01); *A63B 43/04* (2013.01); *A63B 2225/62* (2013.01); *B29L 2031/52* (2013.01)
USPC .................................. 482/23; 482/44; 482/92

(58) Field of Classification Search
USPC ......... 483/23, 44–50, 92, 111, 112, 131, 142; 473/569, 593, 595–599, 603, 604, 609, 473/610, 611, 614; D21/707, 712, 713
See application file for complete search history.

(56) References Cited

U.S. PATENT DOCUMENTS

D21,060 S  *  9/1891  Amselem ..................... D21/713
1,531,317 A  *  3/1925  Stubbs ......................... 473/609

(Continued)

FOREIGN PATENT DOCUMENTS

CA       2410704 A1    5/2004
DE    29707658 U1      7/1997

(Continued)

OTHER PUBLICATIONS

Intention to grant the European Counterpart Application, No. 10 737 890.3, dated Nov. 4, 2013, 27 pages.

(Continued)

*Primary Examiner* — S. C.
*Assistant Examiner* — Garrett Atkinson
(74) *Attorney, Agent, or Firm* — William J. Sapone; Ware Fressola; Maguire & Barber LLP (57) ABSTRACT

A gymnastic tool (1) is formed by at least two impermeable external walls (2, 3) which are each concave shaped and provided with respective edges (4,5). The at least two impermeable walls (2, 3) are mutually fixed together by a connector (6), the gymnastic tool having at least one inner cavity.

11 Claims, 9 Drawing Sheets

(51) Int. Cl.
*B29D 22/00* (2006.01)
*A63B 41/00* (2006.01)
*A63B 41/08* (2006.01)
*A63B 43/00* (2006.01)
*B29C 41/04* (2006.01)
*B29C 41/20* (2006.01)
*A63B 43/04* (2006.01)
*B29L 31/52* (2006.01)

(56) References Cited

U.S. PATENT DOCUMENTS

| | | | | |
|---|---|---|---|---|
| 1,771,861 A | * | 7/1930 | Penfold | 156/81 |
| 1,964,008 A | * | 6/1934 | Roberts | 473/609 |
| 2,078,382 A | * | 4/1937 | Hanshaw | 473/595 |
| 2,244,503 A | * | 6/1941 | Riddell | 473/597 |
| 2,521,703 A | * | 9/1950 | Emmitt | 473/596 |
| 2,621,334 A | * | 12/1952 | O'Hare | 2/209.11 |
| 2,935,320 A | * | 5/1960 | Chupa | 473/610 |
| 3,040,384 A | | 6/1962 | Whittington | |
| 3,119,617 A | * | 1/1964 | Topper | 473/593 |
| 3,165,565 A | | 1/1965 | Cox et al. | |
| 3,664,401 A | | 5/1972 | Travati | |
| 3,863,923 A | * | 2/1975 | Anderson | 473/604 |
| 4,340,222 A | * | 7/1982 | Kerkenbush et al. | 473/610 |
| 5,045,011 A | * | 9/1991 | Lovik | 446/46 |
| 5,098,095 A | * | 3/1992 | Weiss | 473/593 |
| D340,489 S | * | 10/1993 | Evangelista | D21/713 |
| 5,286,020 A | | 2/1994 | Caruso | 473/603 |
| 5,342,268 A | | 8/1994 | Caruthers | 482/108 |
| D351,203 S | * | 10/1994 | Handy | D21/713 |
| 5,709,623 A | * | 1/1998 | Schwaner | 473/604 |
| 5,890,999 A | * | 4/1999 | Kildani | 482/49 |
| 5,941,785 A | * | 8/1999 | Bartels | 473/597 |
| 6,123,633 A | * | 9/2000 | Guenther et al. | 473/604 |
| 6,228,001 B1 | * | 5/2001 | Johnson et al. | 482/48 |
| 6,422,960 B1 | * | 7/2002 | Touhey et al. | 473/593 |
| 6,491,595 B1 | * | 12/2002 | Feeney et al. | 473/593 |
| 6,575,855 B1 | * | 6/2003 | Buzak et al. | 473/569 |
| D478,947 S | * | 8/2003 | Lu | D21/662 |
| 6,629,908 B2 | * | 10/2003 | Hamady | 482/45 |
| 6,663,520 B2 | * | 12/2003 | Ou Chen | 473/604 |
| 6,966,857 B2 | * | 11/2005 | Kennedy et al. | 473/593 |
| 7,175,573 B1 | * | 2/2007 | Huang | 482/110 |
| D571,874 S | * | 6/2008 | Krysiak | D21/712 |
| 8,454,483 B1 | * | 6/2013 | Bradley et al. | 482/92 |
| 2004/0048720 A1 | * | 3/2004 | Kuo | 482/45 |
| 2006/0035763 A1 | * | 2/2006 | Patterson | 482/93 |
| 2006/0063653 A1 | * | 3/2006 | Wickens et al. | 482/142 |
| 2006/0205544 A1 | * | 9/2006 | Wyner et al. | 473/569 |
| 2007/0178997 A1 | * | 8/2007 | Chang | 473/603 |
| 2007/0225133 A1 | * | 9/2007 | Castro | 482/140 |
| 2007/0259761 A1 | * | 11/2007 | Lin | 482/142 |
| 2008/0064540 A1 | * | 3/2008 | Chen | 473/604 |
| 2008/0305900 A1 | * | 12/2008 | Geisendorfer | 473/596 |
| 2010/0285931 A1 | * | 11/2010 | Heller | 482/92 |
| 2013/0190113 A1 | * | 7/2013 | Bevier | 473/604 |

FOREIGN PATENT DOCUMENTS

| | | |
|---|---|---|
| DE | 19715621 A1 | 10/1998 |
| GB | 702174 A | 1/1954 |
| WO | WO2007/035776 A | 3/2007 |

OTHER PUBLICATIONS

Italian Search Report, for IT BO20090495, dated Mar. 17, 2010, two (2) pages.
International Search Report, for PCT/EP2010/060920, dated Oct. 18, 2010, three (3) pages.

* cited by examiner

GYMNASTIC TOOL, APPARATUS AND METHOD TO CARRY OUT IT

TECHNICAL FIELD

The present invention relates to the technical field of gymnastic and plays apparatus and it refers to a gymnastic tool, in particularly suitable for the aerobic exercises, for training the equilibrium and coordinating, of rehabilitating and in the same way suitable for clearance and to the recreation.

BACKGROUND OF THE INVENTION

There are known gymnastic and plays devices consisting of balloons made of flexible or elastic material whose forms are assured by an over-pressure at the internal air. Said known devices are fit for many exercises and games but they are limited by their spherical shape and by their balancing.

DISCLOSURE OF THE INVENTION

An object of the present invention is to propose a gymnastic tool which is very resistant and has symmetry shapes different from the spherical shapes and can be shaped in almost infinite forms.

Another object is to propose a gymnastic tool which can be ballasted, with liquids, powders or other materials, so that the barycentre can be moved in respect with the geometric centre and eventually that said barycentre can move in almost random manner.

Further object is to propose a gymnastic tool which allows new and efficacious training and rehabilitating exercises and which is also amusing.

Another object is to propose an apparatus as well as a method to carry out said apparatus in a simple and economic manner.

DESCRIPTION OF THE DRAWINGS

The characteristics of the invention are evidenced in the following with particular reference to the attached drawings, in which.

BEST MODE FOR CARRYING OUT THE INVENTION

With reference to figures from 1 to 4, numeral 1 indicates the gymnastic tool, object of the present invention, comprising two external walls 2, 3 impermeable, each of them is concave shaped and is equipped with respective edges 4, 5 circular fixed mutually by means of a connecting means 6.

In an operation condition of the tool, the external walls 2, 3 are almost spherical cap shaped, each of them having solid angle bigger than 180°.

In alternative, the invention provides that one or both caps subtend a solid angle equal to or smaller than 180° and/or and the surface of said caps can be almost spherical or lobe shaped, with sectors, for example similarly to the surface of a peeled citrus, or provided with protrusions or shapes. In case of external walls 2, 3 having lobe shapes or with sectors, the edges 4, 5 obviously are not circular but assume a shaped form for example a daisy shaped form.

The external walls 2, 3 are made of flexible and/or elastic material, for example a non-toxic flexible thermoplastic material after the forming, or a rigid or semi-rigid material. The connecting means 6 consist of an impermeable separator which divides the internal cavity of the tool in two completely separated chambers 7, 8. Said impermeable separator of the connection means is made of flexible plastic material, for example PVC or rigid plastic.

The materials of the external walls and of the separator can be of plastic type including also the bi-component materials and/or polymerisable materials or mixtures.

Figure 1:
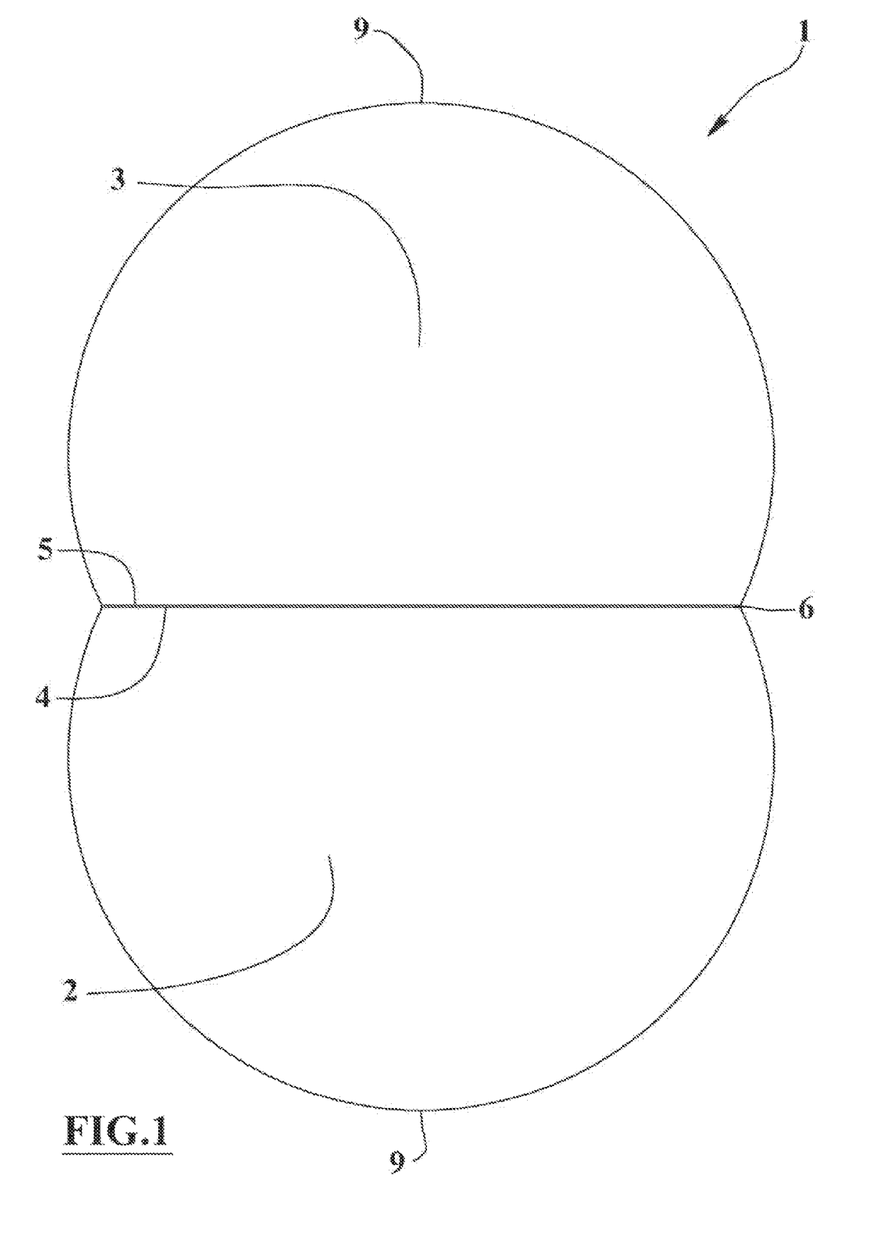
FIG. 1 shows a side-view of the gymnastic tool object of the present invention.
Figure 2:
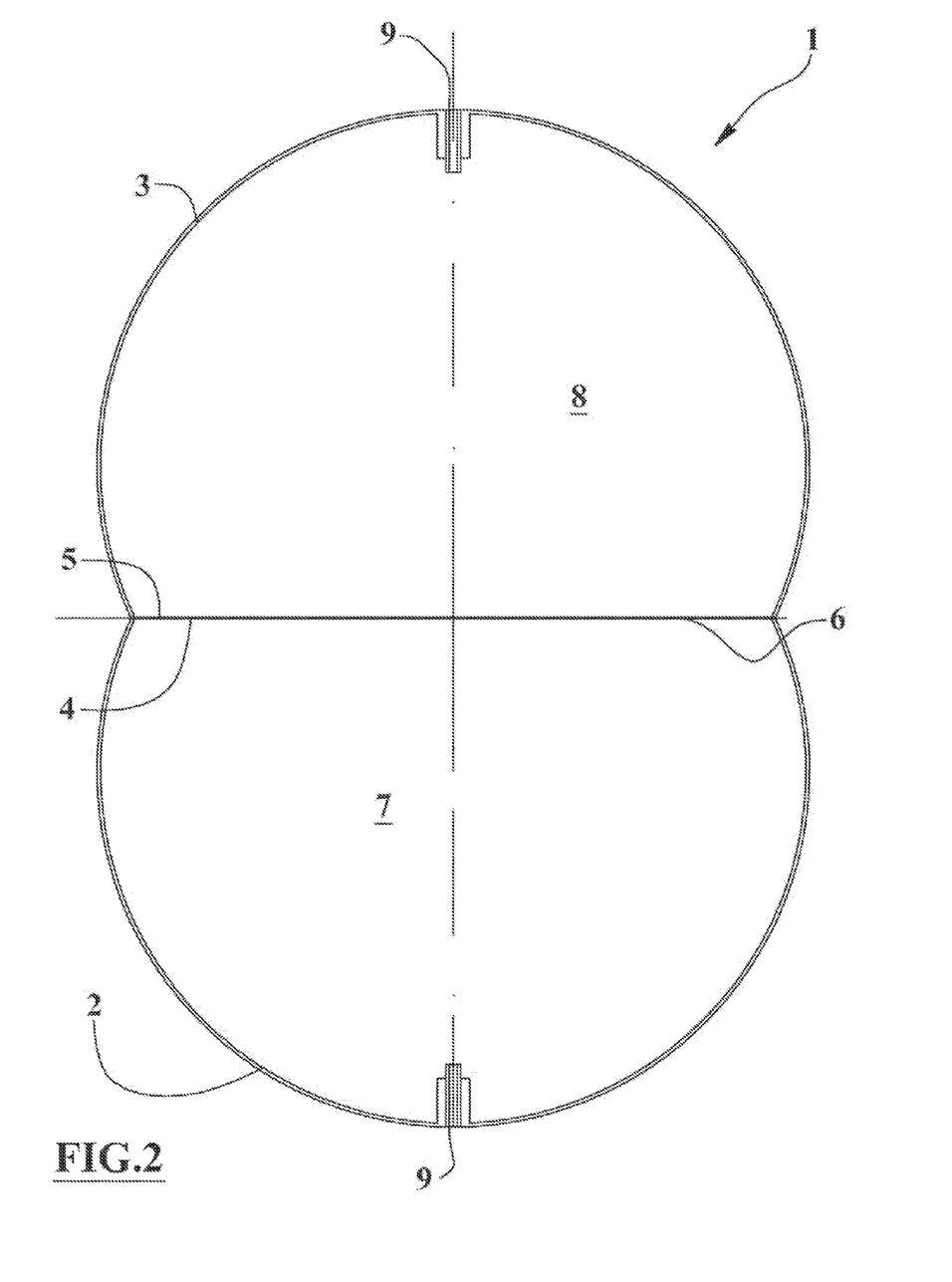
FIG. 2 shows a transversal plane section view of the tool of FIG. 1.
Figure 3:
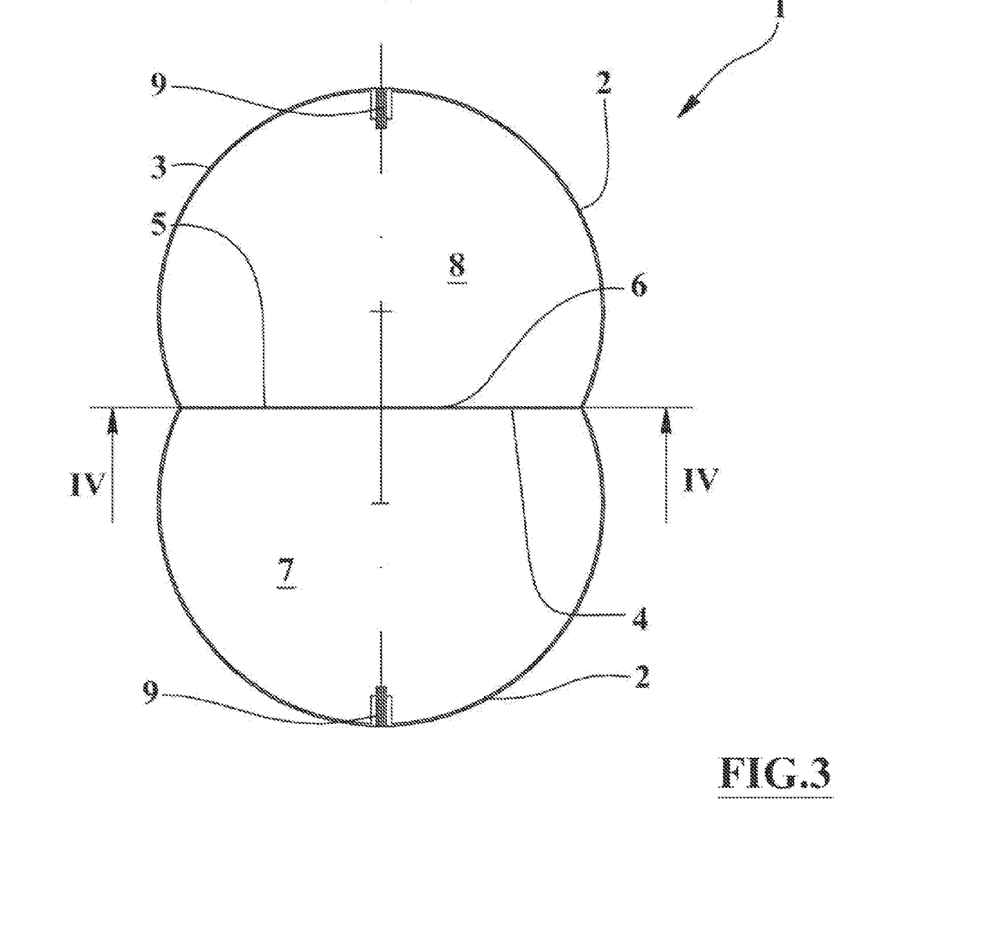
FIGS. 3 and 4 show respectively a reduced view of FIG. 2 and a section view at the plane IV-IV of FIG. 3.
Figure 4:
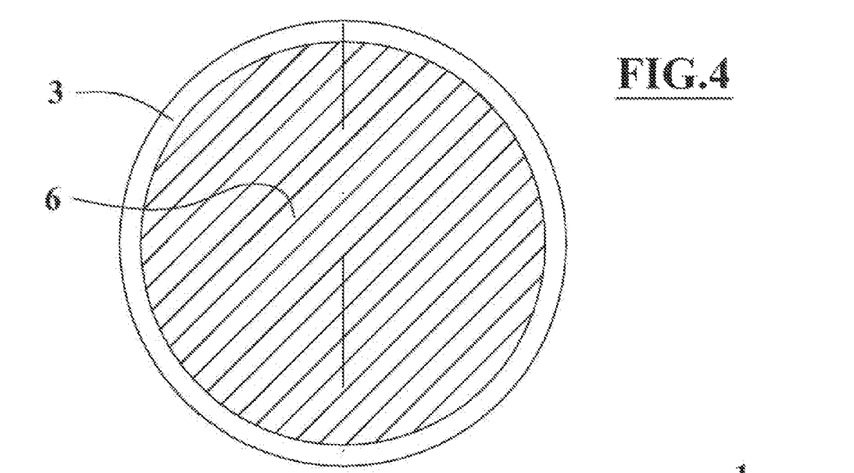

The external wall 2, 3 of each separated chamber 7, 8 comprises a valve means 9 of the type fit for gas and liquid, to inflate said walls and for the possible insertion of ballast liquid in one or both of the chambers 7, 8. each valve means is applied to the respective external wall preferably at zenithal or azimuthal position.

Each flexible or elastic external wall or else each rigid external wall assumes the spherical cap shape with solid angle bigger than 180° in the operation condition in which the respective chamber 7, 8 has a predetermined pressure respectively bigger or also equal to the environmental pressure.

If one or both external walls of spherical cap shaped having solid angle equal to or smaller than 180°, said walls can be made of flexible and elastic material or of rigid material. In particular the tool can assume a lenticular biconvex lens shape with one or both rigid walls.

Figure 5:
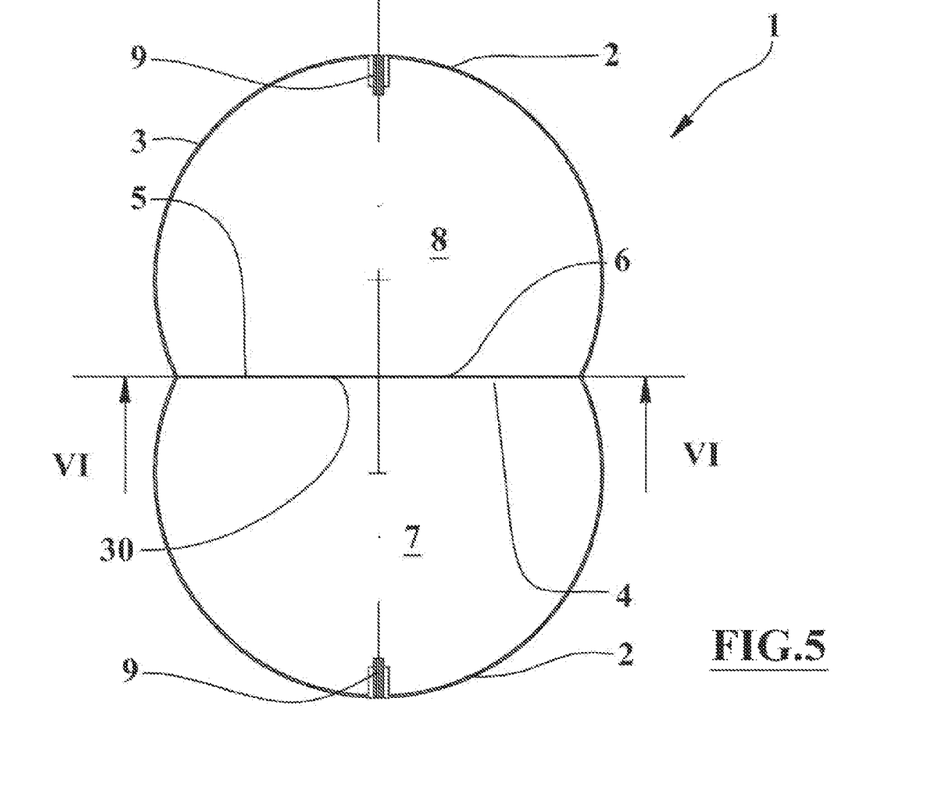
FIGS. 5 and 6 show respectively a section view of a variant of the tool of FIG. 1 and a section view at the plane VI-VI of FIG. 5.
Figure 6:
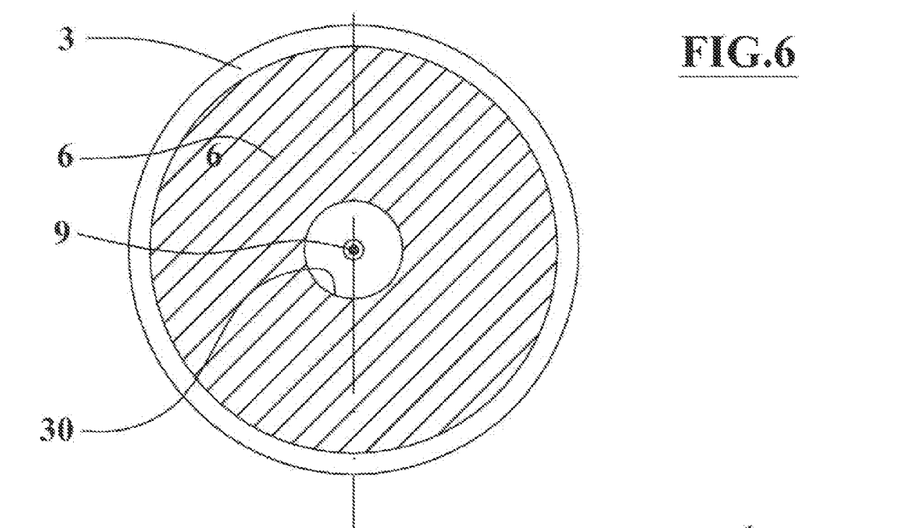

The variant of the tool shown in FIGS. 5 and 6 provides that the connecting means 6 consist of a separator with a centre hole 30 and that it separates the cavity in two communicating chambers. In this variant it is sufficient to have only one valve means.

Figure 9:
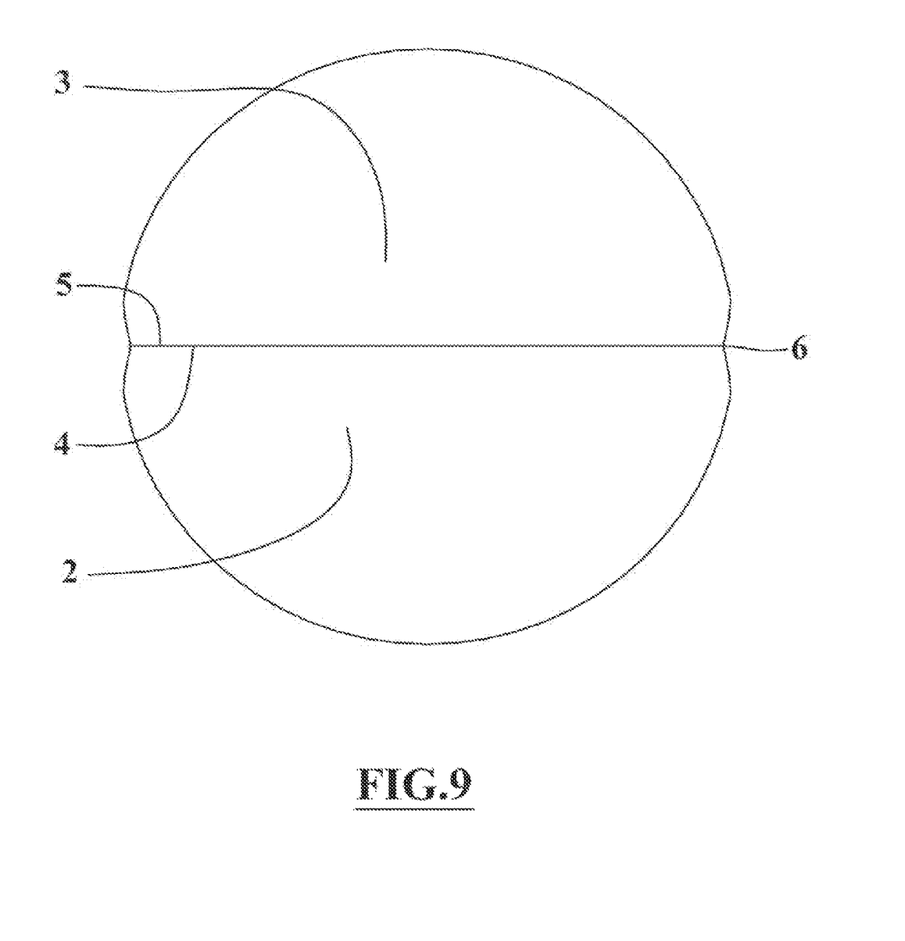
FIGS. 9 and 10 respectively show a side view and a top view of a second variant of the gymnastic tool of FIG. 1.
Figure 10:
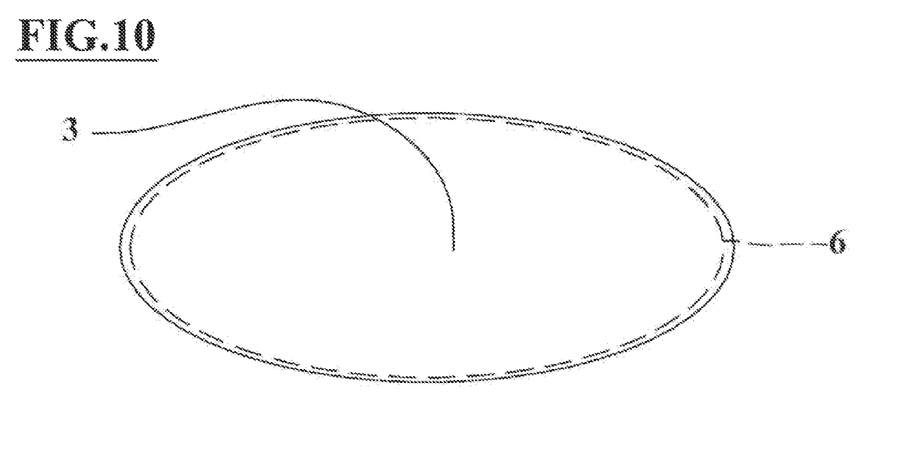

The variant of the tool shown in FIGS. 9 and 10 provides that the connecting means 6 and the edges 4, 5 of the external walls 2, 3 are not circular but are elliptic shaped, as shown in FIG. 10, or oval, or smoothed triangle shaped or similar.

The shape of this variant allows, for instance, to train the user's balance particularly in the front-back or side directions according to the orientation of the shorter axis of the connecting means 6.

Figure 11:
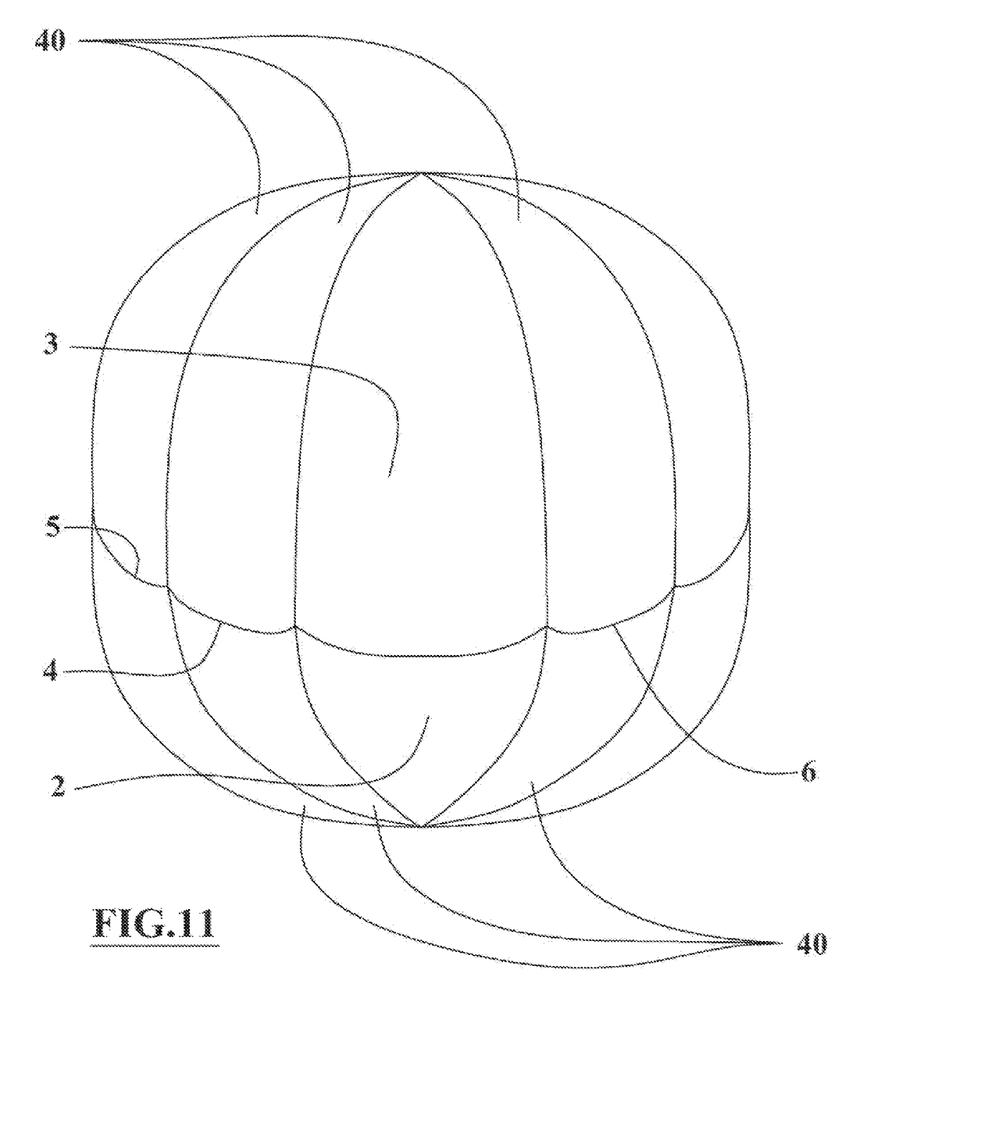
FIGS. 11 and 12 show perspective views of respective further variants of the gymnastic tool of FIG. 1.

In the variant of the tool shown in FIG. 11, the external walls 2, 3 are shaped with protruding meridian lobes 40, similarly to the surface of a peeled citrus. In this variant the edges 4, 5 can be not circular and can assume a daisy like shape. In alternative the external walls 2, 3 can be shaped as protruding parallel lobes, each shaped as an annular portion of a torus. These shapes allow the tool to assume both relatively stable positions in respect to the environment and/or to the user and to assume unstable positions providing a different training. The shape of this variant further provide unexpected reactions and rebounds and it allows user or users to play in original manner.

Figure 12:
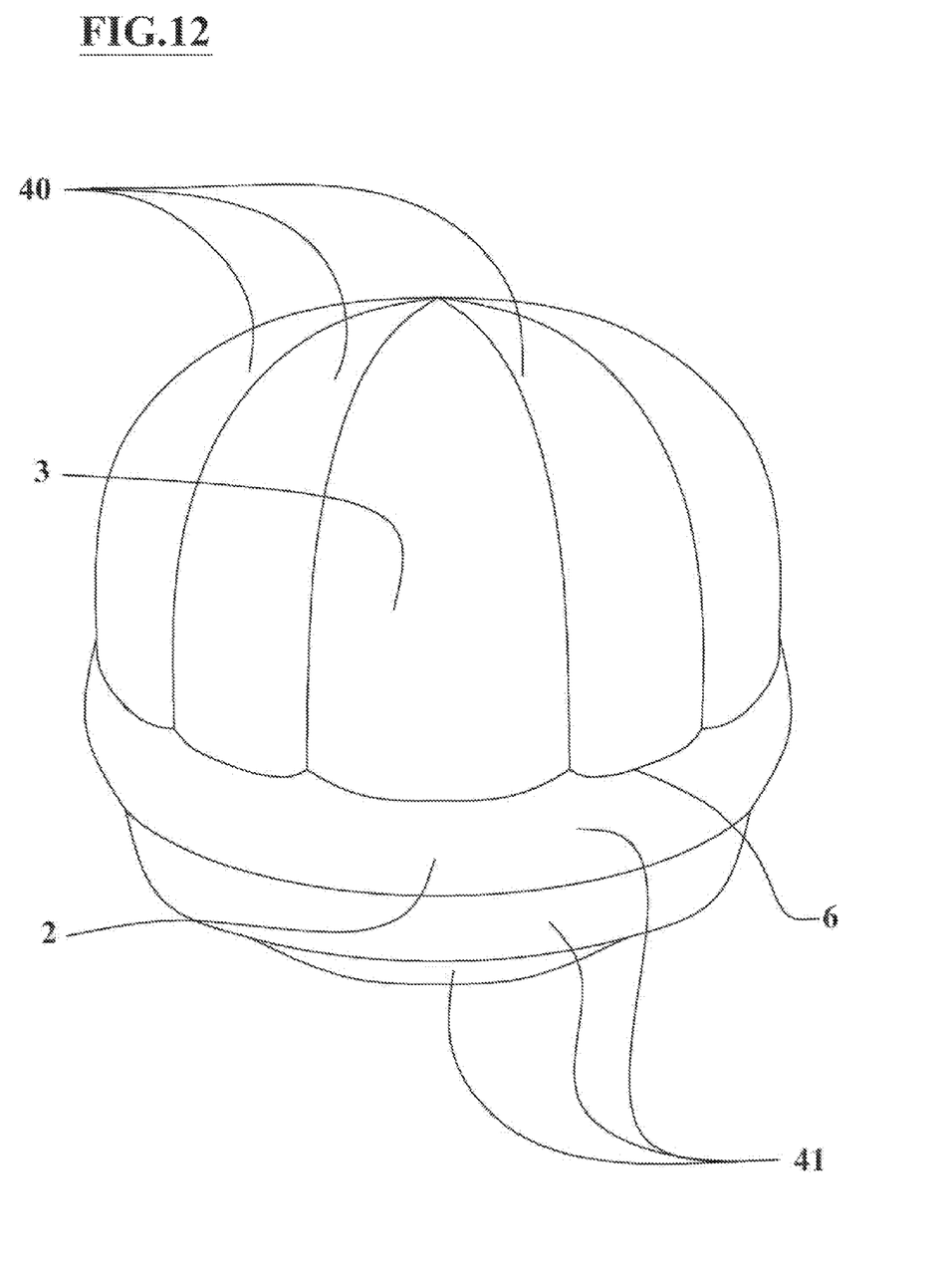

In the variant of the tool shown in FIG. 12, the shapes of the external walls 2, 3 are different, for instance, one 2 is shaped with protruding meridian lobes 40 and the other 3 is shaped as protruding parallel lobes 41. This variant allow the tool to provide further trainings and/or plays and to change the effect thereof simply utilizing an external walls 2 or the other 3.

The invention further provides that one of the two airtight external walls 2 is shaped with protruding meridian lobes 40 or with protruding parallel lobes 41 and the other 3 is spherical cap shaped. This variant allows, for instance, to vary the balance and or the reactions of the tool in respect to the user's actions.

A further simple variant of the tool, which can be understood without asking specific figures, provides that the connecting means are constituted by a annular means almost ring shaped or having thin circular rim. Said annular means is flexible and inextensible.

A further variant not shown provides that the tool is provided with three or more external walls mutually fixed by means of more connecting means 6. In this manner, the tool can have a "sausages" shape with tripod or many others.

The operation of the gymnastic tool provides that it can be ballasted or not and can be manipulated according to predetermined exercise schemas or free manner and/or the game manner. It is also provided that the tool, for example in case it is carried out in lenticular biconvex lens shape, can be used as support partially or totally unstable for the user.

Figure 7:
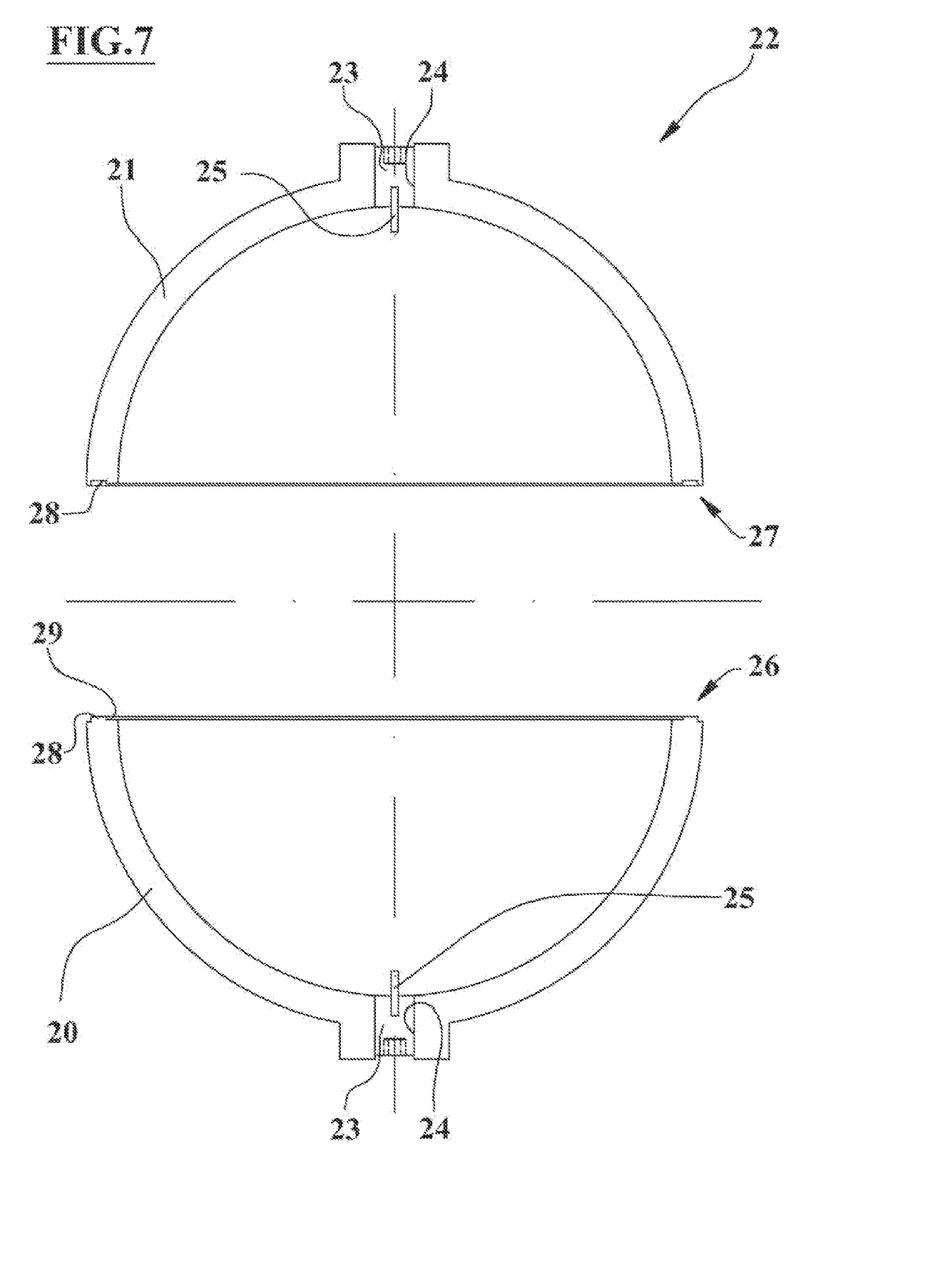
FIG. 7 shows a section view of two separate elements of a mould of the apparatus, object of the present invention, to carry out the gymnastic tool.

The apparatus for carrying out the gymnastic tool comprises a mould 22 whose elements 20, 21 are schematically shown in the FIG. 7 in a removed away condition.

The apparatus comprises tightening means, which is known and not shown, fit to translate mutually and to tighten the two elements 20, 21 of the mould 22.

The internal face of each element 20, 21 is spherical cap shaped having solid angle equal to or slightly smaller than 180°, with spherical surface or lobe shape, sectors or provided with depressions or shapes.

The elements 20, 21 have, at zenithal and azimuthal position, respective inlets 24 which can be closed and opened by means of respective opening means 23, for example of screw-type.

Each opening means 23 is equipped with supporting means 25 protruding inside the element in the closing condition of the corresponding inlet, and fit to support a valve means, or one connection thereof, to be incorporated into the external walls 2, 3 of the tool.

The edges 26, 27 of the two elements 20, 21 have respective optional register annular means 28 assigned to the perfect mutual alignment of the two elements and eventually to shear, by their sharpened edge not shown, the portion protruding from the connection means.

Said edges 26, 27 can be also equipped with optional annular housing means 29 fit to house the pre-cut edge according to measure of the connecting means 6.

In alternative the tightening means can be equipped with a knife to cut the protruding portion of the connecting means.

Figure 8:
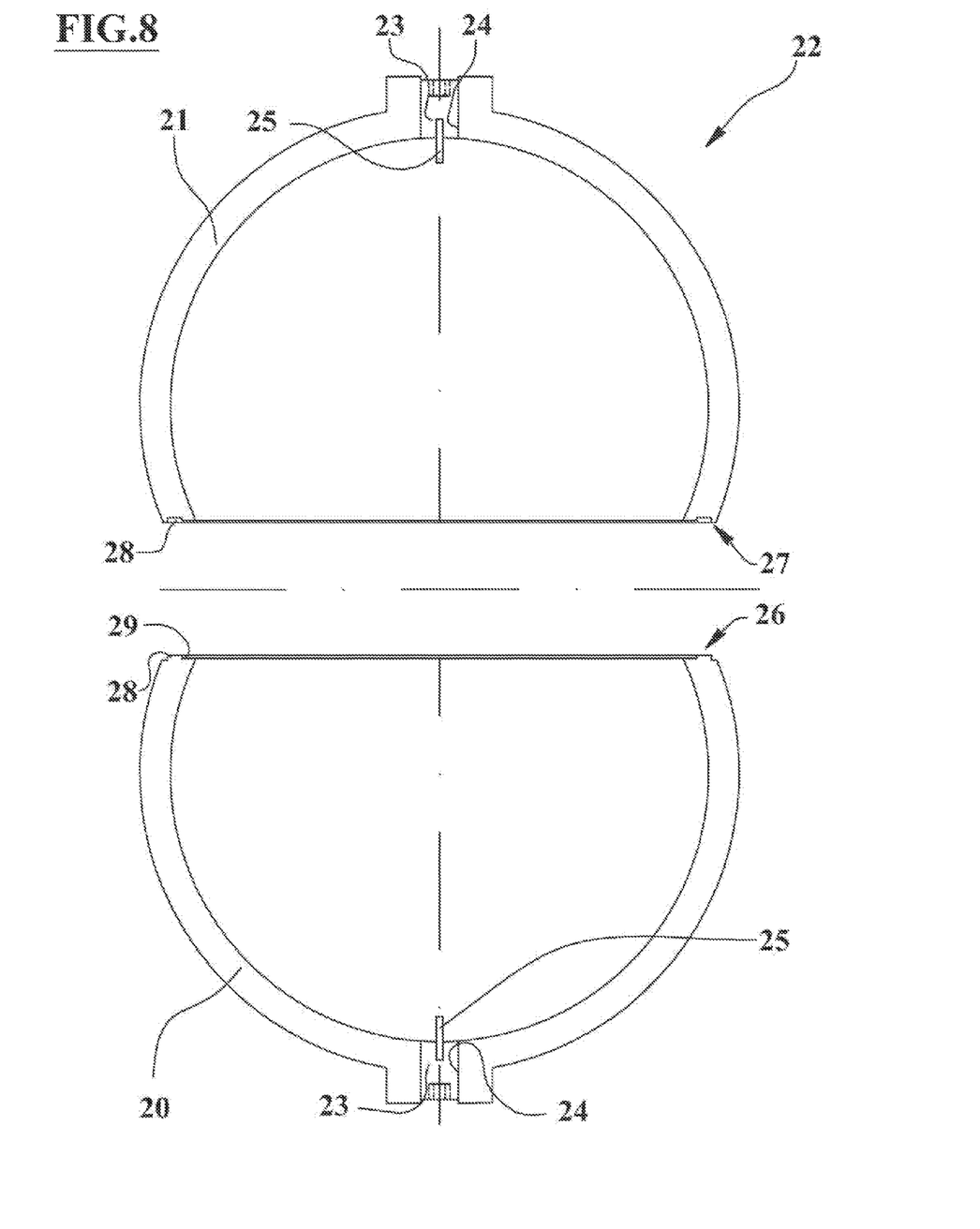
FIG. 8 shows a variant of the mould of FIG. 7.

The variant of the mould of FIG. 8 is different from that of FIG. 7 due to the fact that the two elements 20, 21 of the mould 22 have respective inner faces of spherical cap shape with angle bigger than 180°. Also in this case the inner surface can be perfectly spherical or lobe shaped sector type or otherwise shaped. Obviously said mould, due to the undercuts, does not render to the use of plastic or resins substances that, at the mounding term, they become rigid.

The operation to carry out the gymnastic tool by means of the above-mentioned apparatus and according to the method object of the present invention comprises the following steps:

to position, by means of the tightening means, the lower member 20 of the mould 22, having the inlet 24 closed by the opening means 23 and spaced apart from the upper member 21 and having the respective edge 26 almost horizontal and oriented upward;

to put a valve means or a connector thereof onto the support means 25 of said opening means 23;

to pour into the lower member 20, through its edge 26, a plastic material of the kind and in the quantity fit for forming the corresponding external wall 2;

to put the connecting means 6 above the edge 26 of the lower member 20 and, if it consists of a separator cut to fit it, to put the edges thereof onto the possible annular housing means 29 of said edge;

by means of the tightening means, to tight the members 20, 21 of the mould 22 clamping the connecting means 6;

to take away the opening means 23 from the inlet 24 of the upper member 21;

if the connecting means 6 consist of an airtight separator, to apply onto the support means 25 of this latter opening means 23 a valve means or a connector thereof;

to pour into the upper member 21, through the respective inlet 24, a plastic material of the kind and in the quantity fit for forming the corresponding external wall 3 and of the same kind or different kind of material poured into the lower member 20;

to close said inlet 24 by means of the opening means 23;

to introduce the mould 22, by means of the tightening means or together with them, into a molding oven for example of heated rotation mould type.

at the end of the heating and of the rotation, to take out the mould 22, to open it and to take out the formed tool;

to perform the possible blowing and/or the possible filling of the chamber 7, 8 or of the inner cavity, through the at least one valve means 9.

The method provides furthermore to use the connecting means 6 consistent in a sheet or in a separator of flexible material, for example of PVC, or rigid material.

The method provides also the steps to use a plastic material for forming of the flexible or elastic external walls 2, 3, for example an elastic thermoplastic non-toxic material after the heat-moldings. It is also provided, in particular but not exclusively when an element 20, 21 internally having spherical cap shape with solid angle smaller than 180°, to use a rigid or semi-rigid plastic material following the molding to form rigid or semi-rigid walls 2, 3 with solid angles smaller or even bigger than 180°.

An advantage of the present invention is to propose a gymnastic tool which is very resistant and has symmetry forms different from the spherical form and can be shaped in almost infinite forms.

Another advantage is to propose a gymnastic tool which can be ballasted with liquids, powders or other materials, so that the barycentre can be moved in respect with the geometric centre and eventually that said barycentre can move in almost random manner.

Further advantage is to propose a gymnastic tool which allows new and efficacious training and rehabilitating exercises and which is also amusing.

Another advantage is to propose an apparatus as well as a method to carry out said apparatus in a simple and economic manner.

The invention claimed is:

1. A unitary gymnastic tool consisting essentially of:
at least two interior chambers, a first chamber defined by a first impermeable external wall, and a second chamber defined by a second impermeable external wall;

the first and second external walls having facing edges, a planar connecting wall disposed between the facing edges;

the planar connecting wall fixing the respective edges together so as to make the external walls inseparable, the fixed first impermeable external wall and second external wall forming the unitary gymnastic tool, and, wherein at least the first impermeable exterior wall is in the form of a truncated sphere having a circumferential angle greater than 180° and less than 360°; and wherein the planar connecting wall is a planar impermeable separator which separates the first chamber from the second chamber; and further comprising at least two valves, each valve mounted to a respective external wall for admitting a fluid to each of the two separated chambers.

2. The unitary gymnastic tool according to claim 1 wherein the planar connecting wall and the edges of the two impermeable external walls have a circular, elliptical, oval or smoothed triangle shape.

3. The unitary gymnastic tool according to claim 1 wherein at least one of the impermeable external walls is made of flexible or resilient material.

4. The unitary gymnastic tool according to claim 1 wherein the planar connecting wall is at least partially flexible or rigid.

5. The unitary gymnastic tool according to the claim 1 wherein at least one chamber thereof is under a predetermined pressure greater than a pressure of the environment.

6. The unitary gymnastic tool according to claim 1 wherein the second external impermeable wall is shaped to have protruding meridian lobes.

7. The unitary gymnastic tool according to claim 1 wherein the second external impermeable wall is shaped to have protruding parallel lobes, each lobe being an annular portion of a torus.

8. The unitary gymnastic tool according to claim 1 wherein the two impermeable external walls have substantially identical shapes.

9. The unitary gymnastic tool according to claim 1 wherein the second impermeable external wall has a shape different from the first impermeable external wall shape.

10. The unitary gymnastic tool according to claim 1 wherein the second impermeable external wall is shaped to have protruding meridian lobes.

11. The unitary gymnastic tool according to claim 1 wherein the second impermeable external wall is shaped to have protruding parallel lobes.

* * * * *